United States Patent [19]

Parker et al.

[11] Patent Number: 5,802,638
[45] Date of Patent: Sep. 8, 1998

[54] ADJUSTABLE LOAD SUPPORTING APPARATUS

[75] Inventors: George Christopher Parker, Westcliff-on-Sea; Mark A. Sanders, Windsor; Alexander Joseph Kalogroulis, Coulsdon, all of United Kingdom

[73] Assignee: Keymed (Medical & Industrial Equipment) Ltd., Essex, United Kingdom

[21] Appl. No.: 522,341

[22] PCT Filed: Mar. 18, 1994

[86] PCT No.: PCT/GB94/00557

§ 371 Date: Oct. 17, 1995

§ 102(e) Date: Oct. 17, 1995

[87] PCT Pub. No.: WO94/21209

PCT Pub. Date: Sep. 29, 1994

[30] Foreign Application Priority Data

Mar. 18, 1993 [GB] United Kingdom .................. 9305552

[51] Int. Cl.⁶ .............................. A47B 7/00; F16D 31/02; F15B 21/04
[52] U.S. Cl. .................................. 5/611; 5/600; 91/4 A; 60/469; 60/477
[58] Field of Search ...................... 91/4 A, 4 R; 60/469, 60/477, 481, 482; 5/611

[56] References Cited

U.S. PATENT DOCUMENTS

| | | | |
|---|---|---|---|
| 3,472,183 | 10/1969 | Goodman | 5/611 |
| 3,724,004 | 4/1973 | Behrens | 5/611 |
| 3,818,516 | 6/1974 | Hopper et al. | 5/611 |
| 4,015,538 | 4/1977 | Webb et al. | 91/4 R |
| 4,862,529 | 9/1989 | Peck | 5/611 |
| 5,245,718 | 9/1993 | Krauska | 5/611 |
| 5,265,421 | 11/1993 | Somers | 60/469 |
| 5,303,437 | 4/1994 | Hung | 5/611 |

FOREIGN PATENT DOCUMENTS

| | | |
|---|---|---|
| 0188706 | 7/1986 | European Pat. Off. . |
| 0195490 | 9/1986 | European Pat. Off. . |
| 0221037 | 5/1987 | European Pat. Off. . |
| 1802193 | 8/1970 | Germany . |
| 8900902 | 11/1989 | Netherlands ................. 5/611 |
| 852889 | 11/1960 | United Kingdom . |
| 2045601 | 11/1980 | United Kingdom . |
| 2156476 | 10/1985 | United Kingdom . |
| 2173771 | 10/1986 | United Kingdom . |
| 2174596 | 11/1986 | United Kingdom . |
| 2250189 | 6/1992 | United Kingdom . |
| 9111979 | 8/1991 | WIPO ................. 5/611 |

Primary Examiner—Steven N. Meyers
Assistant Examiner—Tuyet-Phuong Pham
Attorney, Agent, or Firm—Beveridge, Degrandi, Weilacher & Young, LLP

[57] ABSTRACT

A rest portion is used to support a load at an adjustable height relative to a base which is connected to the rest portion by a pivotal linkage. A hydraulic ram coupled to a gas spring cylinder applies a spring force between the linkage and the base, the geometry of the linkage and ram being such that the upward component of spring force is invariant with respect to height adjustment. A control valve allows the ram to be locked at a selected height and the spring force provided by the gas spring is adjustable by movement of a second piston within the gas spring cylinder to vary the available volume of gas. A hydraulic pump is used to supply hydraulic fluid to the cylinder for adjusting movement of the second cylinder. The apparatus is suited for use in a chair-bed enabling a patient to be supported at an adjustable height during medical treatment.

29 Claims, 7 Drawing Sheets

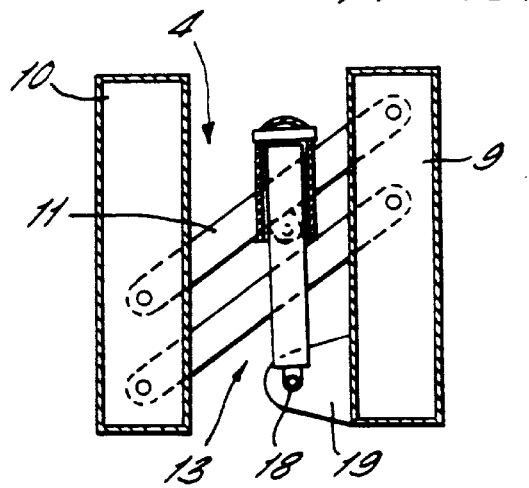
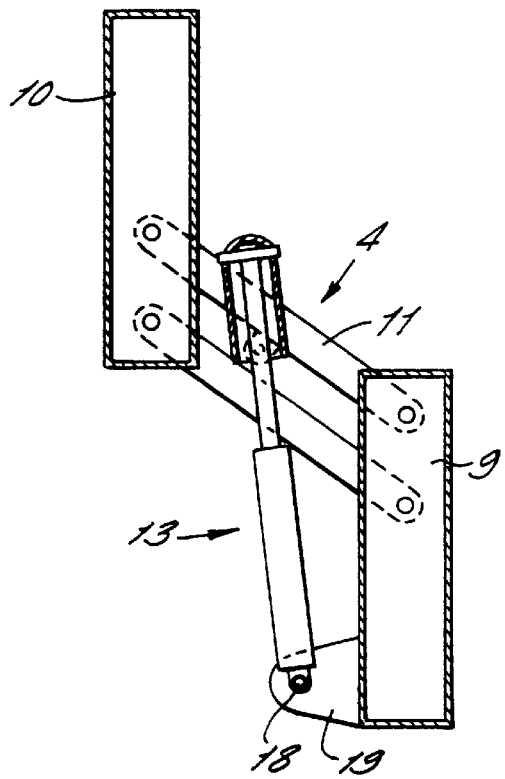
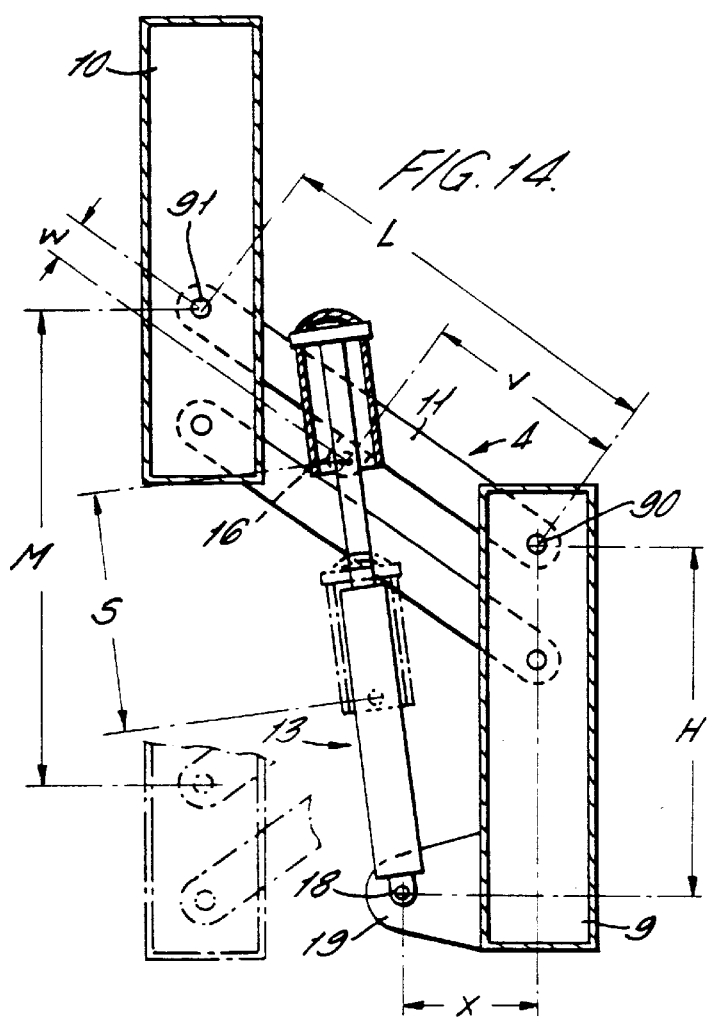

ADJUSTABLE LOAD SUPPORTING APPARATUS

This invention relates to an apparatus and method for supporting a load at an adjustable height and in particular but not exclusively to adjustable chair-beds for use in supporting patients during medical treatment and to a method of raising and lowering the patient with minimal effort. The invention also relates to a gas spring for use in such apparatus.

It is known to provide adjustable chair-beds in which a patient is supported on a rest portion which can be adjusted in height relative to a base. This is particularly useful where the chair-bed is to be used in one mode for transportation or rest for the patient and in another mode for supporting the patient during medical treatment. Typically such chair-beds have a rest portion which is jointed to provide a lea rest, footrest and back rest which can be adjusted relative to a fixed seat to allow the patient to adopt a suitable attitude in the above modes.

Height adjustment in such chair-beds is typically effected by means of a hydraulic ram acting between the base and the rest portion. In co-pending application GB-9225791.4 the applicant discloses an alternative arrangement in which a hydraulic ram acts on a pivotal linkage connecting the base to the rest portion, the arrangement being such that a height adjustment is achievable which exceeds the available travel of the hydraulic ram.

During upward adjustment of such chair-beds, a foot-pump is generally employed to actuate the ram and work done in raising the rest portion and the load carried by the rest portion is dissipated during subsequent downward adjustment when the hydraulic ram is simply allowed to relax to its non-extended configuration. Repeated height adjustment therefore requires considerable energy to be expended by the operator particularly where exceptionally heavy patients are supported.

According to the present invention there is disclosed apparatus for use in supporting a load at an adjustable height comprising a rest portion for supporting a load in use, a base connected to the rest portion by a linkage facilitating adjustment of the height of the rest portion relative to the base and locking means selectively operable in a locking state to lock the position of the rest portion relative to the base and in an unlocked state to facilitate height adjustment, wherein the apparatus further comprises spring means operable at least when the locking means is in an unlocked state to apply a spring force directly or indirectly between the base and the rest portion and adjustment means operable independently of height adjustment to adjust the spring force such that an upward component of the spring force acting on the rest portion has a value which is thereby adjustable to exceed the weight of the rest portion by an amount substantially corresponding to the weight of the load.

An advantage of such apparatus is that during downward height adjustment the load and the rest portion travel in opposition to the upward component of spring force through a distance equal to the adjustment in height so that the work done in compressing the spring means is available as stored energy which is recoverable during subsequent upward height adjustment. The stored energy is essentially the product of the upward component of spring force and the distance travelled, subject to any losses inherent in the spring means.

Preferably the spring means comprises a gas spring.

The use of a gas spring has the advantage of providing a compact structure of low mass and high efficiency.

Preferably the gas spring comprises a cylinder defining a chamber receiving a quantity of gas, a first piston movable within the cylinder in response to pressure of the gas, and the adjustment means is operable independently of the position of the first piston to vary the volume of the gas within the chamber.

Since the force exerted by a gas is proportional to the gas pressure and since the gas pressure is dependent upon the available volume within the chamber, the adjustment means provides a means of adjusting the force applied by the gas spring. For each setting of the adjustment means, the gas spring will exert a force which varies with first piston position since the first piston position itself determines the volume of gas within the chamber to produce a repeatable characteristic of gas spring force as a function of piston displacement. Different settings of the adjustment means provide for different characteristics of force as a function of piston displacement.

Conveniently the adjustment means comprises a second piston movably mounted in the cylinder of the gas spring such that the volume of gas occupies a first portion of the chamber bounded by the first and second pistons.

Preferably the adjusting means comprises pump means operable to pressurize a volume of hydraulic fluid and communicating with a volume of hydraulic fluid filling a second portion of the chamber of the gas spring chamber bounded by the second piston whereby actuation of the pumping means delivers fluid into the second portion of the chamber so as to move the second piston in a direction in which the gas volume is decreased.

A conventional hydraulic pump may thereby be connected by suitable hydraulic fluid couplings to the cylinder of the gas spring and may be conveniently remotely located for foot operation.

The apparatus advantageously includes a first pressure relief valve operable to relieve fluid pressure developed by the pump means above a maximum limit.

The apparatus may further comprise a release valve communicating with the second portion of the chamber of the gas spring and selectively operable to allow hydraulic fluid to leave the second portion of the chamber to thereby effect adjustment of the second piston in a direction in which the gas volume is increased.

The position of the second piston within the cylinder of the gas spring may thereby be adjusted either by operation of the pump means or by operation of the release valve which are operable to vary the volume of incompressible hydraulic fluid on one side of the second piston.

The spring force may be applied to the rest portion by means of a hydraulic ram comprising a hydraulic cylinder communicating with a volume of hydraulic fluid filling a third portion of the chamber of the gas spring bounded by the first piston.

Since hydraulic fluid is essentially incompressible, any extension of contraction of the ram is accompanied by movement of the first piston.

Conveniently the locking means comprises a control valve selectively operable in the locking state to isolate the hydraulic ram from fluid communication with the third portion of the chamber of the gas spring.

Advantageously a valve means is connected between the hydraulic ram and the third portion of the chamber of the gas spring, the valve means being operable to limit the rate of flow of hydraulic fluid to be less than a maximum limit.

The maximum rate at which the rest portion is able to move is thereby limited as a safety feature.

A second pressure relief valve may be connected in parallel with the control valve in order to communicate between the hydraulic ram and the third portion of the chamber of the gas spring in the event of the pressure across the control valve exceeding a maximum limit.

Advantageously a linear actuator constituted by the hydraulic ram is connected between the base and the linkage such that pivotal movement of the linkage associated with raising and lowering of the rest portion is accompanied by extension and contraction respectively of the actuator during height adjustment.

Since hydraulic fluid is incompressible, the operation of the valve in the locking state prevents movement of the ram and thereby prevents movement of the rest portion relative to the base.

Preferably the spring means is operable to apply the spring force in a direction which is inclined relative to the vertical direction by an angle which is variable with pivotal movement of the linkage.

Preferably the linkage comprises a link member having first and second pivotal connections to the rest portion and the base respectively and wherein the spring means acts on the link member at a location which is intermediate the first and second pivotal connections and which offset by a finite displacement (W) from a locus of linear alignment with the pivotal axis of the pivotal connections when viewed in axial projection. The spring means may further act on the base at a location which is intermediate the pivotal axes when viewed in vertical projection and which is below the level of the pivotal connection between the base and the link member.

Such an arrangement for the geometry of the ram and the linkage has been found to be advantageous in achieving a uniform upward component of spring force throughout the stroke of the gas spring.

In a preferred embodiment the apparatus constitutes an adjustable chair-bed for use in supporting a patient during medical treatment.

According to a further aspect of the present invention there is disclosed a method of operating an apparatus for supporting a load at an adjustable height having a rest portion connected to a base by a linkage facilitating adjustment of the height of the rest portion relative to the base, the method comprising the steps of placing a load so as to be supported by the rest portion, applying a spring force by operation of a spring means directly or indirectly between the base and the rest portion and adjusting the spring force by operation of an adjusting means such that an upward component of the spring force acting on the rest portion has a value exceeding the weight of the rest portion by a variable amount substantially independent of height adjustment, adjusting the height of the load by raising or lowering the rest portion until a desired height is obtained and locking the rest portion relative to the base by operation of a locking means.

The adjustment means may be operated such that the variable amount is greater than or less than the weight of the load by an increment sufficient to effect raising or lowering of the load respectively during height adjustment.

During such height adjustment the elevation of the rest portion and load makes use of energy stored in the spring means, this energy being input into the spring means during any operation of the adjusting means to increase the spring force. Operation of the adjusting means to decrease the spring force will involve a loss of stored energy from the spring means. This energy loss is however less than that which occurs in operation of conventional height adjusting apparatus where all of the potential energy put into raising a load is subsequently lost when the load is lowered.

Typically it will be necessary to apply an external force to the rest portion to control motion of the rest portion during height adjustment and such an external force will typically be manually applied by an operator.

Alternatively the adjusting means may be operated such that the variable amount is substantially equal to the weight of the load whereby the rest portion and the load are substantially held in equilibrium, an external force then being provided to effect motion during height adjustment.

According to a further aspect of the present invention there is disclosed a gas spring comprising a cylinder defining a chamber; first and second pistons movable in the cylinder to define a first portion of the chamber receiving a quantity of gas and bounded by the first and second pistons, a second portion bounded by the second piston and a third portion filled with hydraulic fluid and bounded by the first piston; a hydraulic ram constituting a linear actuator and having an operating cylinder connected in fluid communication with the third portion whereby extension and contraction of the actuator is accompanied by displacement of the first piston to vary the volume of the gas within the first portion; and adjusting means operable to adjust the position of the second piston thereby adjusting the volume of the gas independently of the position of the first piston and of the actuator.

The second portion may be filled with hydraulic fluid and the adjusting means may then be operable to inject or withdraw hydraulic fluid to or from the second portion.

Conveniently the adjusting means comprises a pump means operable to pressurize a volume of hydraulic fluid and communicating with the second portion whereby actuation of the pumping means delivers fluid into the second portion so as to move the second piston in a direction in which the gas volume in the first portion is decreased.

The adjusting means may further comprise a release valve communicating with the second portion and selectively operable to allow hydraulic fluid to leave the second portion to thereby effect movement of the second piston in a direction in which the gas volume within the first portion is increased.

The pump means and the operating cylinder of the hydraulic ram may conveniently be mounted integrally in a common housing.

A conventional hydraulic ram and integral pump may thereby be modified by isolating the pump from the ram and adding interconnecting hydraulic hoses between the pump, gas spring cylinder, control valve and the ram.

The adjustment means may alternatively comprise a control rod connected to the second piston and extending into the second portion to a variable extent.

According to a further aspect of the present invention there is disclosed a gas spring cylinder assembly for use in the above described gas spring and comprising a cylinder defining a chamber, first and second pistons movable in the cylinder to define a first portion of the chamber receiving a quantity of pressurized gas bounded by the first and second pistons, and first and second hydraulic fluid couplings communicating with the second and third portions respectively for connection in use to a pumping means and to a hydraulic ram respectively.

According to a further aspect of the present invention there is disclosed an adjustable chair-bed for use in supporting a patient during medical treatment comprising a rest portion defining a supporting surface upon which a patient rests in use, a linkage adjustably connecting the rest portion to a base, the linkage comprising parallel first and second links being pivotally connected between an upwardly extending pillar of the base and a downwardly extending support leg of the rest portion to provide a parallel motion mechanism in which the attitude of the rest portion relative to the base is constrained to be invarient in response to height adjustment of the rest portion relative to the base, and a hydraulic ram connected between the linkage and the base so as to extend obliquely relative to the vertical direction whereby the links are pivotable in response to extension and contraction of the ram to effect raising and lowering of the rest portion respectively.

Preferably each of the first and second links comprises a pair of arms rigidly interconnected by an obliquely extending brace.

Preferred embodiments of the present invention will now be described by way of example only and with reference to the accompanying drawings of which:

FIG. 12 is a schematic representation of the hydraulic ram of the gas spring of FIGS. 6 to 11 in relationship to the linkage in a configuration in which the chair-bed is fully lowered;

FIG. 13 is a schematic representation of the arrangement of FIG. 12 in which the chair-bed is fully raised; and FIG. 14 is a schematic representation corresponding to FIG. 13 with additional labelling of dimensional parameters.

Figure 1:
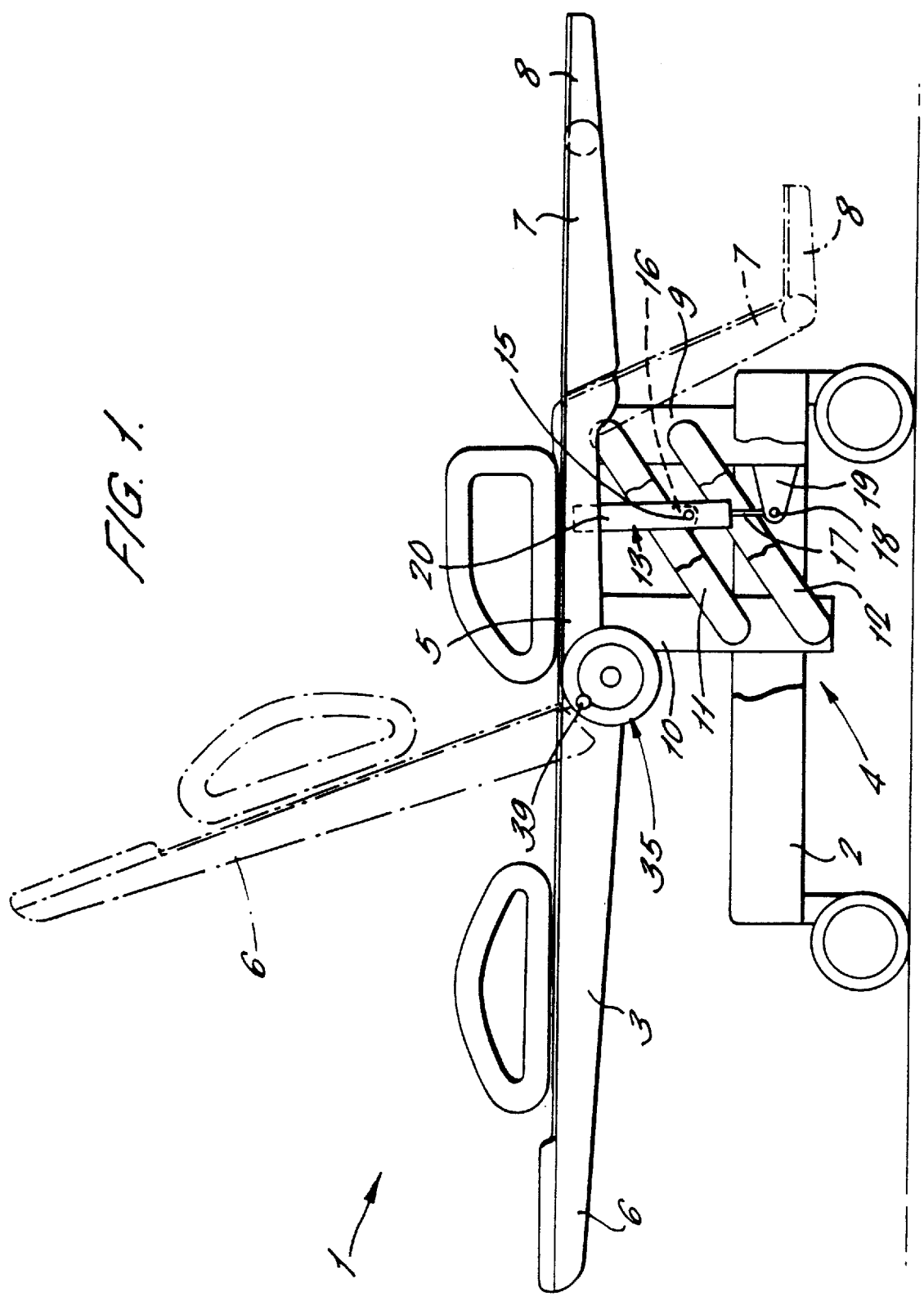
FIG. 1 is a side elevation of a chair-bed adjusted in a position of minimum height.

In FIG. 1 a chair-bed 1 comprises a wheeled base 2 which is connected to a rest portion 3 by a pivotal linkage 4.

The rest portion 3 comprises a seat 5 which is hingedly connected to a back rest 6 and a leg rest 7. A footrest 8 is hingedly connected to the leg rest 7.

The rest portion 3 is shown in solid lines in the reclined horizontal position for receiving a supine patient and in broken lines in an inclined position for receiving a seated patient. Pivotal movement of the back rest 6, leg rest 7 and footrest 8 between the seated and supine positions is co-ordinated by a conventional lever operated mechanism (not shown).

A pillar 9 projects upwardly from the base 2 to which it is rigidly mounted and a vertical support leg 10 extends downwardly from the framework of the seat 5 to which it is rigidly attached.

The linkage 4 comprises first and second links 11 and 12 respectively, each link being pivotally connected to both the support leg 10 and the pillar 9 so as to form a parallelogram structure in which the pillar and support leg remain vertical whilst the links 11 and 12 are pivotable to adjustable angles in parallel relationship with one another thereby providing a parallel movement mechanism which retains the support leg 10 vertical whilst allowing height adjustment of the rest portion 3.

Each of the links 11 and 12 is comprised of an assembly of struts resembling a wishbone when viewed in plan view (not shown) thereby providing ample rigidity. The length of each link 11, 12 measured between pivot axes is 350 mm.

Figure 2:
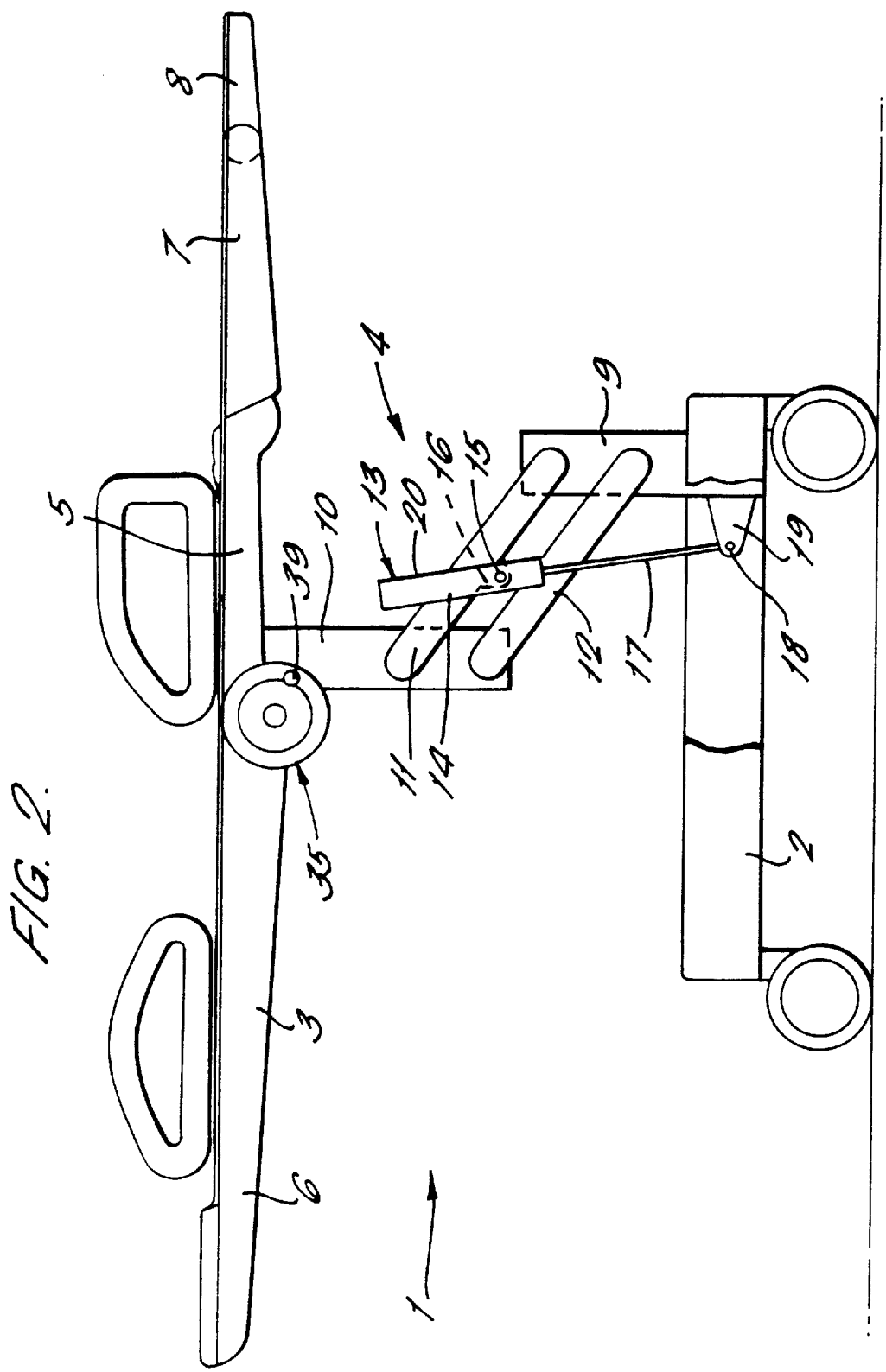
FIG. 2 is a side elevation of the chair-bed of FIG. 1 adjusted in a position of maximum height.

In FIG. 2 the chair-bed 1 is shown in a position of maximum height adjustment in which the links 11 and 12 extend at an upwardly inclined angle relative to the pillar 9 so as to raise the rest portion 3 by 0.41 meters above the lowered position of FIG. 1.

A hydraulic ram 13 comprises a hydraulic cylinder 14 which is mounted by means of a pivotal mounting 15 to a flange 16 projecting downwardly of the first link 11. The hydraulic cylinder 14 has an actuator 17 connected by means of a second pivotal mounting 18 to a bracket 19 projecting laterally of the pillar 9 so that the ram and actuator together constitute an extensible member allowing the distance between mountings 15 and 18 to be varied.

Figure 3:
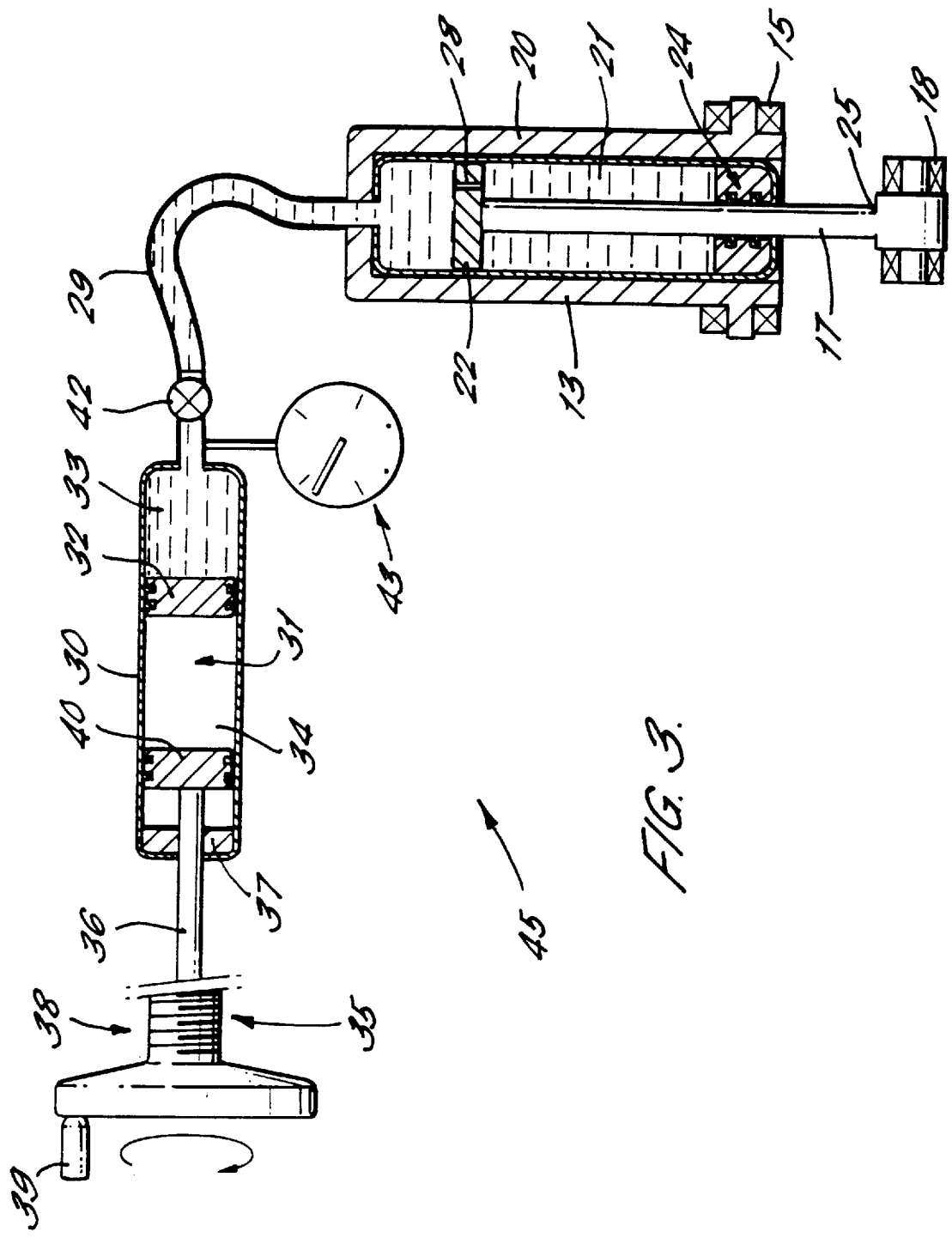
FIG. 3 is a schematic representation of a gas spring for use in the chair-bed of FIGS. 1 and 2.

The structure of the hydraulic ram 13 is shown schematically in FIG. 3 to comprise a first cylinder 20 defining a cylindrical bore 21 within which an actuating piston 22 is axially movable. The actuating piston 22 is connected to the cylindrical rod actuator 17 which projects axially from the cylinder through a seal 24 such that a free end 25 of the actuator is secured to the second pivotal mounting 18. A first mounting 15 is secured to the first cylinder 20.

The actuating piston 22 is formed with a narrow axial passageway 28 which allows equalization of pressure on either side of the actuating piston. The bore 21 is filled with incompressible hydraulic fluid so that any excess pressure in the fluid over ambient pressure external to the cylinder 20 results in an axial force being exerted on the actuator 17 which is proportional to the cross-sectional area of the actuator within the seal 24.

A connecting means 29 in the form of a flexible hydraulic hose connects the first cylinder 20 to a second cylinder 30 defining a cylindrical chamber 31. A first piston 32 is axially movable in the chamber 31 and partitions the chamber into a fluid filled portion 33 which is filled with hydraulic fluid in fluid communication with the hydraulic fluid within the bore 21 of the first cylinder 20 and a gas filled portion 34 which is filled with a sealed quantity of nitrogen gas. The first piston 32 acts as a floating piston to equalize pressure between the gas and hydraulic fluid on opposite sides of the first piston.

Pressure of the gas within the gas filled portion 34 is adjustable by action of an adjustment means 35 comprising a control rod 36 extending into the second portion 34 of the chamber 31 and projecting therefrom through a gas-tight seal 37. The adjustment means 35 further comprises a screw mechanism 38 operated by a handle 39 to advance or retract the control rod 36 into the second portion 34.

The control rod 36 is connected within the chamber 31 to a second piston 40 which is slidable in the chamber 31 to vary the gas volume.

A shut-off valve 42 is provided in series with the connecting means 29 to enable the hydraulic fluid in the first cylinder 20 to selectively be isolated from the hydraulic fluid within the second cylinder 30 and a pressure gauge 43 is connected to the second cylinder to monitor the pressure of hydraulic fluid within the first portion 33 of the chamber 31.

The first and second cylinders with their associated pistons and the actuator 17 together comprise a gas spring 45 which is made adjustable by operation of the adjustment means 35. Operation of the gas spring 45 relies on the pressure of gas in the chamber 31 acting on the first piston 32 to provide a force which is coupled to the actuator 17 by means of the hydraulic ram 13. Compression of the gas spring 45 by movement of the actuator 17 inwardly with respect to the first cylinder 20 results in hydraulic fluid being displaced so as to flow into the second cylinder 33 thereby moving the first piston 32 so as to compress the gas. Work done in compressing the gas is stored by virtue of increased gas pressure within the second cylinder 30. Movement of the actuator 17 in the opposite direction is accompanied by reverse movement of the first piston 32 to increase the gas volume and therefore decrease the gas pressure within the second chamber 30. Subject to thermodynamic losses, the stored energy is recovered during this reverse movement as work done by moving the actuator 17.

When the valve 42 is in an open condition, the gas spring 45 exerts a spring force axially via the actuator 17 between the first and second pivotal mountings 15 and 18. The magnitude of this spring force is variable by operation of the adjustment means 35 since for example if the control rod 36 is advanced into the chamber 31 the gas volume is decreased and the gas pressure correspondingly increased. This increase in gas pressure is transmitted to the actuator 17 as an increase in the spring force. Similarly retracting the control rod 36 will reduce the value of the spring force.

Variation in the spring force will also occur for a fixed setting of the adjustment means 35 according to the position of the first piston 32 relative to its available stroke within the chamber 31 since the movement of the first piston is accompanied by change of volume of the chamber. This latter variation in spring force as a function of displacement is referred to as the spring rate characteristic of the gas spring 45.

It is desirable to arrange for the gas spring 45 to have a spring rate characteristic in which the spring force varies as little as possible over the available stroke of the first piston 32. To this end the stroke of the first piston 32 is minimized by arranging for the effective cross-sectional area of the first piston 32 to be greater than the effective piston area of the hydraulic cylinder 13 which in the arrangement of FIG. 3 is determined by the diameter of the actuator 17. This difference in area results in the movement of the first piston 32 being coupled to actuator 17 with a degree of amplification.

The gas spring 45 is utilized in the chair-bed 1 by locating the hydraulic ram 13 as indicated in FIGS. 1 and 2 where detail of the second cylinder 30 has been omitted for clarity.

The location of the pivotal mountings 15 and 18 between which the gas spring 45 exerts a spring force is selected such that to a close proximation the upward component of spring force remains constant throughout the available height adjustment of the rest portion 3. The locations of the mounting points 15 and 18 as shown in FIGS. 1 and 2 were arrived at by an iterative mathematical modeling technique.

In use, the chair-bed 1 is made ready to receive a patient by lowering the rest portion 3 to the fully lowered position shown in FIG. 1 with the back rest 6, leg rest 7 and footrest 8 articulated into a position for receiving a seated patient. The adjustment means 35 is initially set such that the control rod 35 is fully retracted and the gas spring 45 exerts a low upward force such that the rest portion remains at rest.

The patient is then seated on the rest portion thereby applying a load which is transmitted downwardly through the support leg 10 in addition to the weight of the rest portion 6. Typically the load will correspond to the weight of a patient having a mass of about 75 kilograms with typical variation in the range 45 to 200 kilograms. The mass of the rest portion including attachments such as the support leg is of the order of 30 kilograms.

In order to raise the patient to a required height the adjustment means 35 is operated by turning the handle 39 whilst the valve 42 is in an open condition, the control rod 36 thereby being progressively advanced into the second cylinder 30 and increasing the spring force exerted by the gas spring 45. The upward component of spring force exerted by the gas spring 45 on the rest portion 3 via the linkage 4 is increased to a value at which the total weight of the patient and rest portion is balanced by the upward force exerted on the support leg so that the rest portion and load are in equilibrium. An indication that this point has been reached is given by the onset of upward vertical movement of the rest portion as the upward component of spring force slightly exceeds the value required for equilibrium to be achieved. The adjustment means 35 can then be fine tuned to a setting at which any further advancement of the control rod will initiate upward movement.

Any upward force exerted by an operator on the rest portion 3 will then result in upward movement of the rest portion which may then be arrested at any desired height. Minimal effort is required by the operator to achieve this height adjustment since the weight of the load and rest portion is effectively counterbalanced by the action of the gas spring 45 thereby giving the sensation of weightlessness. The effort required by the operator is therefore limited to the force required to overcome the inertia of the load and rest portion in initiating and stopping the travel together with any frictional forces inherent in the apparatus.

Once a desired height has been attained the position of the rest portion can be locked by closing the valve 42.

Subsequent lowering and raising of the patient can similarly be effected simply by opening the valve 42, vertically displacing the rest portion 3 and then reclosing the valve 42 at the new adjusted height. A degree of damping to the vertical movement is provided by the hydraulic ram 13 to an extent largely determined by the size of the passageway 28 which acts as a flow restrictor to the flow of hydraulic fluid. Excessive speeds of adjustment are therefore avoided.

When the patient is to be removed from the chair-bed the height is suitably adjusted and the valve 42 then closed. As the patient is removed from the chair-bed the absence of load on the rest portion 3 creates an imbalance in the force which will be applied by the gas spring 45 when the valve 42 is released. If the valve 42 is released in this condition then the rest portion 3 will automatically be raised by action of the spring force. Normal operation of the chair-bed however will require a further patient to be received on the rest portion 3. Generally the new patient will have a different mass to that of the previous patient and the adjustment means 35 will need to be adjusted if equilibrium is to be achieved before any further height adjustment is made.

The adjustment means 35 may alternatively be deliberately set such that an imbalance in the vertical forces exists by an amount sufficient to cause raising or lowering of the rest portion 3. During such raising or lowering operations it will generally be necessary for an operator to apply some external force to control this motion, the operator being able to lock the rest portion at a required height after manually bringing the rest portion to a stationary position.

The adjustment means 35 may be calibrated to provide an indication of the required setting of the adjustment means for a range of patient weights. The calibration may be indicated by means of a scale and pointer or by any equivalent indicating mechanism. The pressure gauge 43 may also be utilized to obtain an indication of the available spring force of the gas spring 45.

Figure 4:
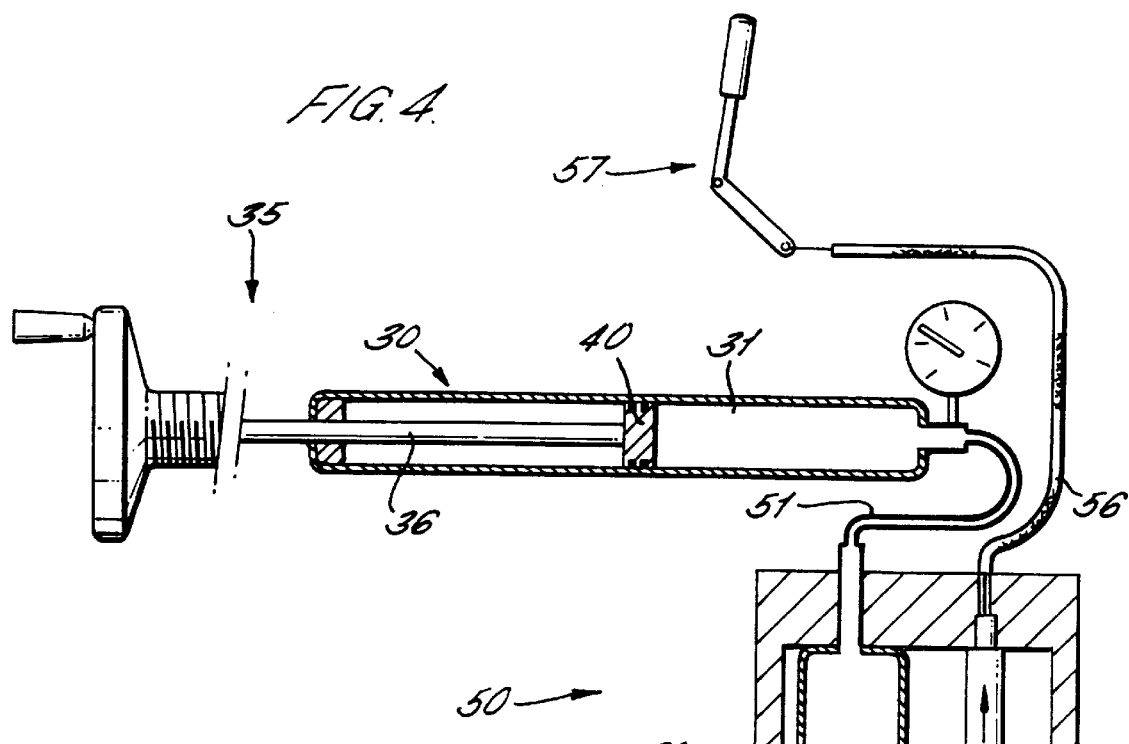
FIG. 4 is a schematic representation of an alternative gas spring for use in the chair-bed of FIGS. 1 and 2.

An alternative gas spring 50 is shown in FIG. 4 and will now be described using corresponding reference numerals to those of preceding Figures where appropriate for corresponding elements.

The gas spring 50 comprises a first cylinder 20 defining a cylindrical bore 21 within which a first piston 32 is axially movable. The first piston 32 is connected to a cylindrical rod actuator 17 which projects axially from the cylinder through a seal 24 such that a free end 25 of the actuator is secured to a second pivotal mounting 18. A first mounting 15 is secured to the first cylinder 20 so that the cylinder 20 and actuator 17 together constitute an extensible member allowing the distance between mountings 15 and 18 to be varied. This extensible member is incorporated into the chair-bed in the same manner as the gas spring 45 of FIG. 3.

The cylinder 20 in FIG. 4 contains air with a small quantity of oil being included to assist in the sealing operation of seal 24. Extension and contraction of the extensible member is therefore effected in the manner of a pneumatic ram by varying the gas pressure within the cylinder 20.

Cylinder 20 is connected to a second cylinder 30 by a gas hose 51 and the second cylinder is provided with a second piston 40 which is axially movable in response to an operation of an adjustment means 35 comprising a control rod 36 extending axially into an air chamber 31 defined by the second cylinder.

Gas pressure within the first cylinder 20 biases the actuator 17 into an extended position so that gas spring action is provided between the pivotal mountings 15 and 18. The magnitude of the spring force can be varied by adjusting the gas pressure independently of the position of the first piston 32 by actuating the adjustment means 35. If for example the adjustment means 35 is operated to advance the control rod 36 into the second cylinder 30 then the gas volume will decrease, the pressure will increase and the spring force will increase correspondingly.

Adjustment using the adjustment means 35 of the spring force may thereby be used to raise or lower a patient or to maintain an equilibrium condition in which raising and lowering is effected by applying an external force.

Since the gas within first cylinder 20 is compressible, a locking valve 42 of the type disclosed with reference to FIG. 3 will not result in rigid locking of the extensible member so that a separate locking mechanism 53 is provided in the arrangement of FIG. 4. The locking mechanism 53 comprises an arm 54 which extends telescopically from a locking cylinder 55 with a control cable 56 connected to an operating lever 57 whereby an operator can remotely actuate the locking mechanism to lock the arm relative to the locking cylinder.

The arm 54 and locking cylinder 55 are connected in parallel with the extensible member constituted by the first cylinder 20 and the actuator 17 so as to extend between the mountings 15 and 18.

Actuation of the locking mechanism 53 thereby allows the height of the rest portion 3 to be locked in any required position. The locking mechanism 53 may comprise a rigid blocking gas strut or alternatively a simple mechanical arrangement in which a pawl is movable into locking engagement with a rack (not shown).

Figure 5:
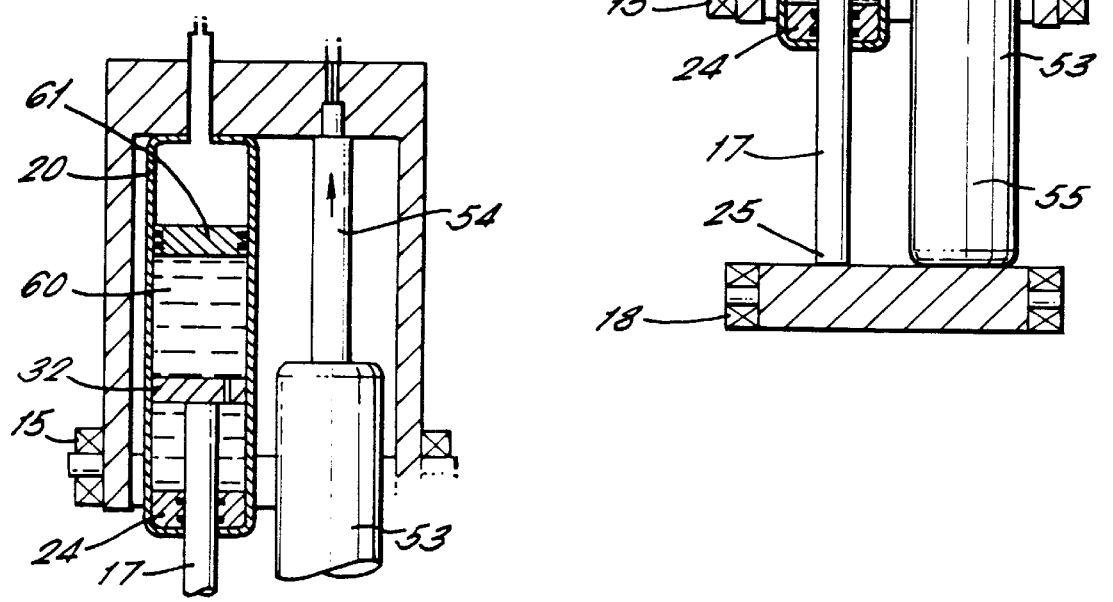
FIG. 5 is a schematic representation of a modified version of the gas spring of FIG. 4.

In FIG. 5 a modified version of the gas spring of FIG. 4 is provided with a reduced working volume of gas by increasing the volume of oil 60 within the first cylinder 20 to a level which is above the first piston 32. A separator piston 61 is provided at the oil/gas interface and is freely movable within the cylindrical bore 21.

An apparatus for use in supporting a load at an adjustable height may include a modified gas spring arrangement as described below with reference to FIGS. 6 to 14. The apparatus may for example be a chair-bed of the type disclosed above with reference to FIGS. 1 and 2 and the following description will refer to such an arrangement for convenience and will use corresponding reference numerals where appropriate for corresponding elements.

Figure 6:
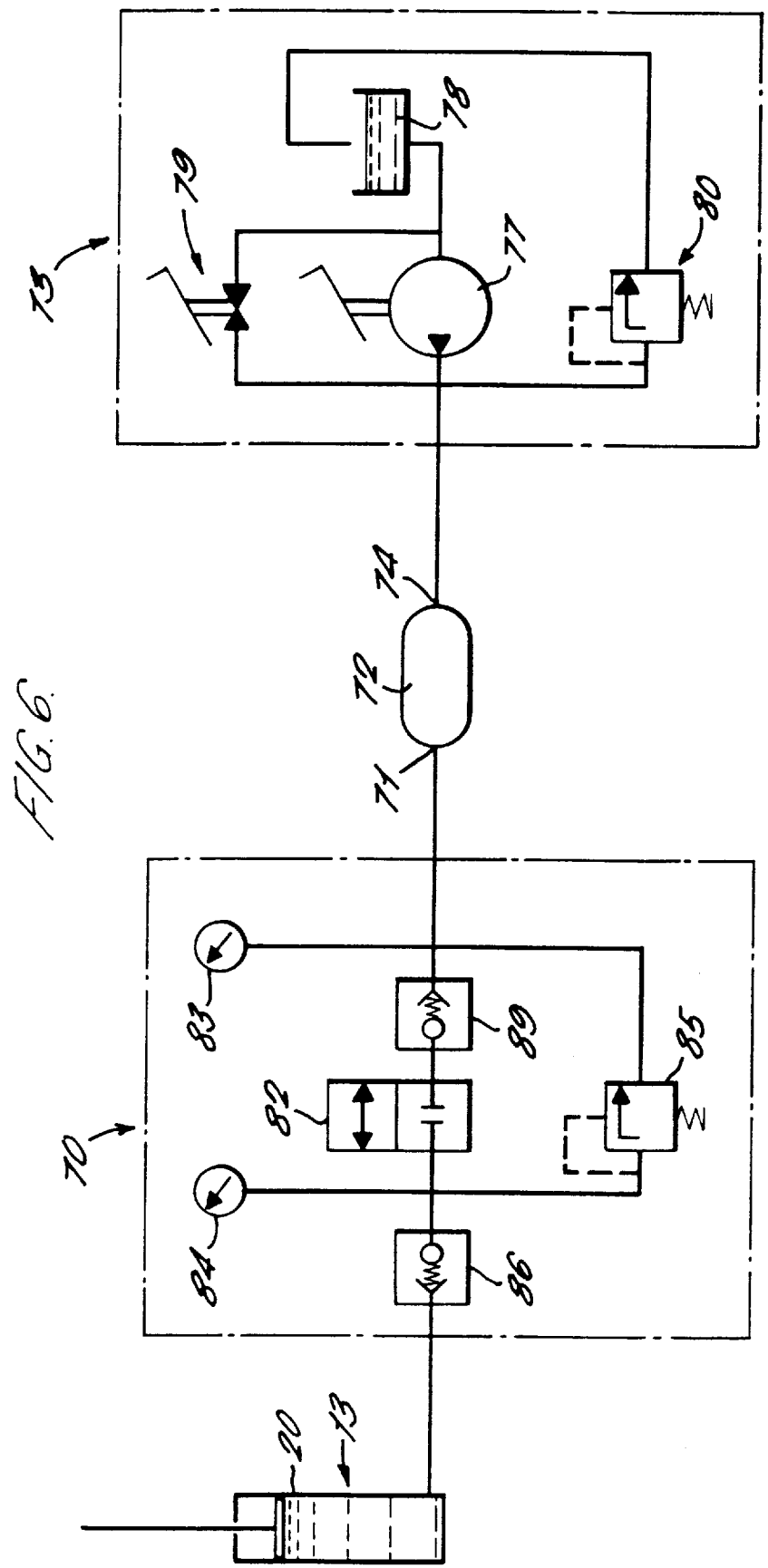
FIG. 6 is a schematic representation of a further alternative gas spring for use in the chair-bed of FIGS. 1 and 2.

FIG. 6 illustrates the manner in which a hydraulic ram 13 is controlled, the ram being connected as a linear actuator in the manner shown in FIGS. 1 and 2 such that extension or contraction of the ram results in raising or lowering respectively of the rest portion.

Figure 11:
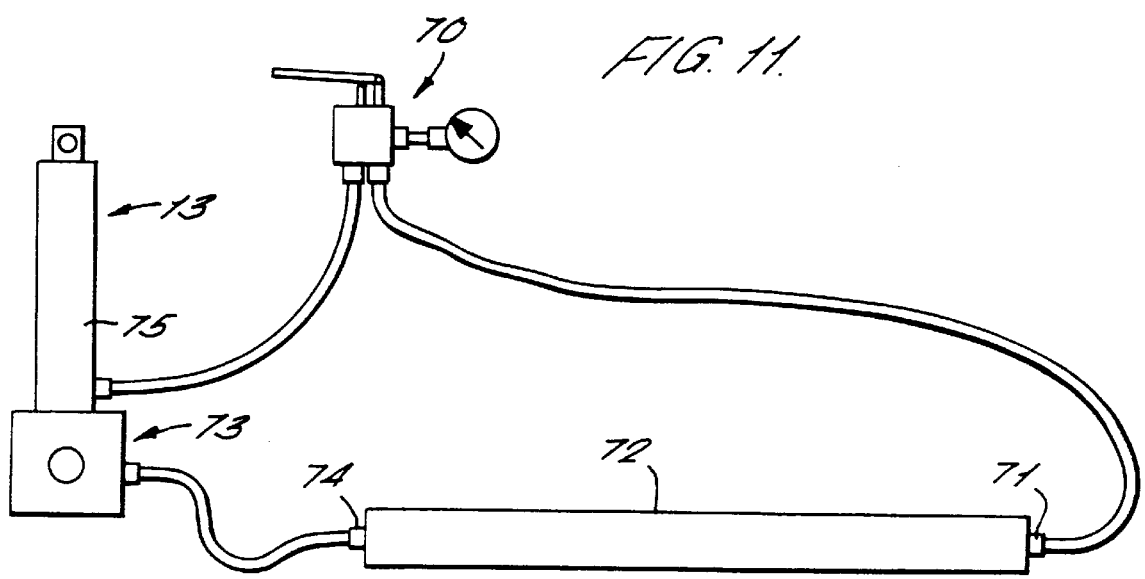
FIG. 11 is a schematic layout of the gas spring of FIGS. 6 to 10 showing the manner of external connection of associated components.

The ram 13 has a cylinder 20 containing hydraulic fluid and which is connected in fluid communication with a control unit 70 which selectively provides fluid communication between the cylinder 20 and a first end connector 71 of a gas spring cylinder 72. The ram 13 is shown schematically in FIG. 6 and in a preferred embodiment include an actuating piston 22 of the type shown in FIG. 3. A pump unit 73 is connected to a second end connector 74 of the gas spring cylinder 72. The physical layout of the apparatus may be as shown in FIG. 11 where the hydraulic ram 13 and the pump unit 73 are integrally formed in a common housing 75.

As shown in FIGS. 7 to 10 the gas spring cylinder 72 contains first and second pistons 32 and 40, each constituting a free piston which is movable in response to differential pressure, a pressurized volume of nitrogen gas being contained in a first portion 76 of a chamber defined within the cylinder and bounded by the first and second pistons.

The pump unit 73 comprises a foot operated pump 77 which is operable to deliver pressurized hydraulic fluid from a reservoir 78 to the second end connector 74 so that hydraulic fluid can be forced into the gas spring cylinder 72 by actuation of the pump 77. A release valve 79 is connected in parallel with the pump 77 and is foot operated such that, when the valve 79 is opened, a return path is established between the second end connector 74 and the reservoir 78 allowing hydraulic fluid to leave the gas spring cylinder 72.

A pressure relief valve 80 is also connected in parallel with the pump 77 and is arranged to bypass the pump in the event of hydraulic fluid pressure exceeding a predetermined maximum limit.

A third portion 81 of the chamber defined by the gas spring cylinder 72 is bounded by the first piston 32 and communicates via the first end connector 71 with the hydraulic ram 13 via the control unit 70, the third portion 81 and interconnecting pipework being filled with hydraulic fluid such that displacement of the ram is accompanied by movement of the first piston 32 within the gas spring cylinder 72. The first portion 76 of the gas spring cylinder chamber contains a fixed mass of gas at a pressure which is equalized to that of the hydraulic fluid in the ram 13 by virtue of the free piston action of the first piston 32. In the configuration shown in FIG. 7 the pistons 32 and 40 are in their outermost positions in which the second piston 40 remains at a stationary location adjacent the second end connector 74 and a maximum volume of gas is defined in the first portion 76 of the chamber. This corresponds to maximum extension of the ram 13 and, in the chair-bed of FIGS. 1 and 2, to the position of maximum height adjustment of the rest portion 3 carrying a load. In the configuration of FIG. 6, the ram 13 is locked in this raised position by action of a control valve 82 of the control unit 70 which is selectively operable to isolate the ram from fluid communication with the gas spring cylinder 72. The pressure of hydraulic fluid in the gas spring cylinder 72 is measurable by means of a first pressure gauge 83 in the control unit 70 connected intermediate the control valve 82 and the gas spring cylinder. The pressure of hydraulic fluid in the ram 13 is measurable by means of a second pressure gauge 84 connected intermediate the ram 13 and the control valve 82.

A second pressure relief valve 85 is connected in parallel with the control valve 82 in order to relieve any excess fluid pressure developed in the ram 13.

A second check valve 86 is connected, in line with the ram 13 and arranged to limit to a maximum value the rate of flow of hydraulic fluid into the ram.

Figure 7:
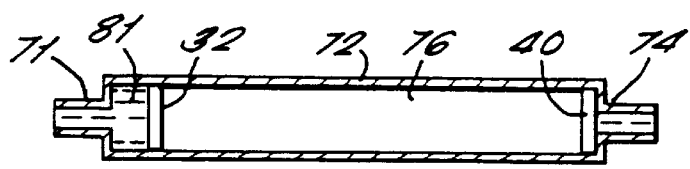
FIG. 7 is a schematic representation of a cylinder of the gas spring of FIG. 6 containing a quantity of gas and showing first and second pistons in a position which the volume of gas is maximized.

With the cylinder 72 having the pistons 32 and 40 in the configuration of FIG. 7, opening the control valve 82 unlocks the ram 13 from its previously locked condition and, in the absence of an applied load on the rest portion 3, it will generally be desirable for the ram 13 to provide sufficient uplift to hold the rest portion in equilibrium which in this instance is its fully raised position. It is therefore necessary for the mass of gas within the first portion of the gas spring cylinder 72 to be pressurized such that, even when occupying its maximum available volume, it is well in excess of atmospheric pressure, the resulting force applied via the second piston 40 to the hydraulic fluid of the ram 13 being sufficient spring force to hold the rest portion static.

Figure 8:
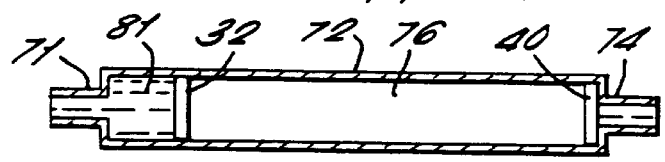
FIG. 8 is a schematic representation of the cylinder of FIG. 7 showing the second piston partially advanced to vary the volume of gas.
Figure 9:
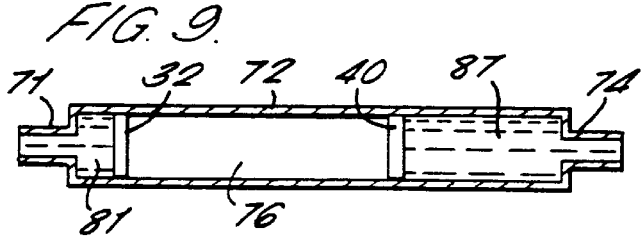
FIG. 9 is a schematic representation of the cylinder of FIGS. 7 and 8 showing the first piston displaced inwardly by hydraulic fluid to thereby reduce the volume of gas.
Figure 10:
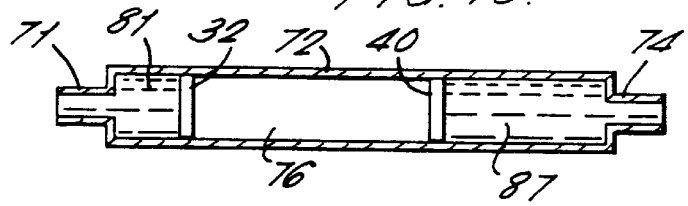
FIG. 10 is a schematic representation of the cylinder of FIGS. 7, 8 and 9 showing the positions of the first and second pistons at which the volume of gas is minimized.

Applying a load onto the rest portion 3 in this configuration (i.e. as shown in FIG. 7) will cause contraction of the ram 13 and a flow of hydraulic fluid into the gas spring cylinder 72 which will move the first piston 32 in a direction tending to reduce the volume of gas as shown in FIG. 8.

In most instances however it would be desirable to remove this imbalance of forces prior to opening the control valve 82. The application of the load to the ram 13 with the control valve 82 closed would result in elevation of the fluid pressure detected using the second pressure gauge 84 compared with the pressure registered by the first gauge 83. By operation of the pump 77 the pressure of fluid within the gas spring cylinder 72 can be raised until the first and second gauges 83, 84 give comparable readings, operation of the foot pump delivering fluid into the gas spring cylinder 72 so as to displace the first piston 32 and adjust the available volume of gas within the first portion 76. Displacement of the second piston 40 creates a second portion 87 of the chamber within the gas spring cylinder 72 and which is occupied by hydraulic fluid communicating with the pump 77 which thereby constitutes an adjustment means for independently varying the available volume of gas.

Reducing the available volume of gas in the first portion 76 will raise its pressure and thereby raise the fluid pressure detected by the first pressure gauge 83. If the gas pressure is elevated such that the gauges both give the same reading and the control valve 82 is then opened, the equalization of pressure thereby created across the control valve will result in no net movement of fluid and therefore no net movement of the ram 13. For the chair-bed of FIGS. 1 and 2 this means that the rest portion 3 is perfectly counterbalanced whilst carrying a load, the gas spring applying a spring force which has been adjusted to achieve this equilibrium. An operator wishing to vary the height of the rest portion 3 may then simply apply manual force so as for example to lower the rest portion to a required height. During such movement, the ram 13 will contract thereby displacing hydraulic fluid and moving the first piston 32 towards the second piston 40 with a resulting elevation in gas pressure. The resulting increase in spring force does not however substantially change the vertical component of spring force because of the geometry of linkage 4 and the manner in which the ram 13 is coupled between the base 2 and the linkage 4. When height adjustment is completed the operator arrests the movement of the rest portion 3 by holding the rest portion and operates the control valve 82 to again lock the ram 13.

Similarly, once an equilibrium balance of pressure has been achieved, raising the load simply requires minimal manual force to be applied to the rest portion 3 to accelerate the load during its travel. In this respect the gas spring cylinder 72 may be regarded as an energy storage device in which the gas is compressed during lowering of the load and stored energy is then utilized during raising of the load by expansion of the gas.

To equalize the pressures on either side of the valve 82 when the load is removed or replaced by a lighter load it is necessary to lower the gas pressure by operation of the release valve 79 thereby allowing the second piston 40 to move in a direction in which the available air volume increases.

An alternative mode of operating the apparatus is to utilize a deliberate imbalance in pressure to deliberately cause raising or lowering of the rest portion 3. For example, with the rest portion 3 in a lowered position, the air pressure may be increased by operation of the pump 77 such that the pressure sensed by the first gauge 83 is greater than that sensed by the second pressure gauge 84. The valve 82 may then be opened to apply increased fluid pressure within the ram 13. This will result in the extension of the ram accompanied by raising of the rest portion 3. When a required height has been achieved, the valve 82 may then be closed.

The gauges 83 and 84 may be calibrated according to the weight of corresponding loads. The reading of the second gauge 84 would then correspond to the weight of the load supported by the rest portion 3. The reading of the first gauge 83 would then correspond to the available upward component of spring force in excess of the weight of the rest portion 3.

The check valves 83 and 86 and the relief valves 80 and 85 are provided in order to avoid improper operation of the apparatus which might otherwise occur with potentially hazardous results.

One situation which might otherwise occur is that the pump 77 might be operated by a user with the valve 82 in the closed position to an excessive extent such that a very high gas pressure was achieved in the absence of any substantial load being applied to the ram 13. If the control valve 82 were then to be opened, a rapid extension of the ram 13 would result with consequent rapid raising of the rest portion 3. This abnormal function is avoided by the presence of the second check valve 86 which restricts the magnitude of the flow rate of hydraulic fluid into the ram 13 to a safe level.

A further situation which might otherwise occur is that a heavy load could be applied to the rest portion 3 thereby placing an excessive load on the ram 13 without a corresponding equilibrium gas pressure having been achieved in the gas spring cylinder 72. If such a load were applied when the control valve 82 were opened, the ram 13 could rapidly be compressed and the load together with the rest portion 3 would descend at excessive speed. This abnormal function is avoided by the presence of the first check valve 89 which limits the rate of flow of hydraulic fluid from the ram.

A further fault condition which might occur with the control valve 82 closed is the application of an excessive load to the rest portion 3 with the rest portion in its raised condition and the ram 13 fully extended. Under these conditions an excessive fluid pressure would develop in the ram and this is relieved by the second pressure relief valve 85 operating to bypass the control valve 82 and allow the ram to lower the rest portion by contracting.

A further potential hazard might occur with an excessive load applied to the rest portion 3. An operator seeking to raise the load with the valve 82 open would continue to pump the pump 77 and the pressure in the gas spring cylinder would progressively rise. Excess pressure beyond a safe limit is avoided in accordance with the present invention by the presence of the relief valve 80 which would prevent the pressure rising above a predetermined threshold limit and thereby prevent the load from being raised.

The geometry of the linkage 4 relative to the ram 13 is illustrated in FIGS. 12 to 14. The pillar 9 remains stationary and fixed to the base 2 as shown in FIGS. 1 and 2 and support leg 10 is supported by linkage 4 at an adjustable height, the parallelogram linkage being arranged to maintain the support leg vertical and parallel to the pillar 9 throughout this motion.

The ram 13 is connected at its lower pivot point 18 to a bracket 19 projecting laterally from the pillar 9 such that the location of the pivot 18 is intermediate first and second pivotal axis 90 and 91 respectively of a link member 11 of the linkage 4 when viewed in vertical projection. The link member 11 extends linearly between the first and second pivotal axis 90 and 91 and has a downwardly projecting flange 16 to which the upper end of the ram 13 is pivotally mounted, the flange 16 projecting downwardly so as to allow the point of pivotal connection to the link member to be off-set by a distance w from a line connecting the pivotal axis 90 and 91 when viewed in horizontal projection as seen in FIG. 4.

The location of the bracket 19 is below the first pivotal axis 90 by a distance such that the lower pivot point 18 of the ram 13 is a distance H below the first pivotal axis.

The linkage 4 is arranged to provide a maximum vertical travel M between lowered and raised positions of the support leg 10 as indicated in FIG. 14 accompanied by a stroke S of the ram 13. Parameters L, v, x have the significance indicated in the diagram of FIG. 14.

In a preferred embodiment of the present invention in which a chair-bed for patient use employs such apparatus, the ram 13 has a rod diameter of 20 millimeters and a stroke of 108 millimeters. The pressure relief valve 85 operates by opening at pressures above 200 bar and the check valves 86, 89 permit a maximum oil flow rate of 1 liter per minute. A volume of 65 cc of oil, representing the displacement of the cylinder rod of the ram, can pass through the control valve 82 when opened into the gas spring cylinder 72 having an internal diameter of 36 millimeters.

A nominal volume of oil, 60 cc, remains within the second portion of the chamber of the gas spring cylinder in the configuration of FIG. 7 of maximum gas volume thereby ensuring that gas pressure is always transmitted to the hydraulic fluid communicating with the ram when the control valve is opened.

The pump 77 is provided with a reservoir 78 of capacity 330 cc and has a pump stroke of 3 cc with a maximum pressure of 200 bar.

Nitrogen gas is contained in the chamber of the gas spring cylinder 72 and in the position of maximum gas volume as shown in FIG. 7 the gas has a pressure 47 bar and occupies 535 cc.

In the configuration of FIG. 8 in which the gas is retracted to its minimum volume, the volume of gas is 159 cc and pressure 160 bar.

The values of dimensions of the parameters shown in FIG. 14 in this embodiment are as follows:

H=300 mm
L=350 mm
M=410 mm
x=117 mm
v=175 mm
w=35 mm
S=208 mm.

With the above parameters, a vertical travel of 410 mm is available and is suitable for handling loads in the range 745 to 2209 newtons.

The above values were arrived at by an iterative method involving the calculation of forces acting at the upper pivotal connection of the hydraulic ram 13 over a range of values of height adjustment, the calculation being carried out on the assumption that the gas spring is adjusted to counterbalance a load of a selected weight at an initial position of the height adjustment. This calculation is repeated for a number of different loads to produce a set of curves in which upward and downward components of force are plotted. The upward component of spring force is calculated from the dynamics of the gas spring using the known properties of the gas and the selected geometry of the hydraulic ram relative to the linkage. The downward component of force is calculated from the known weight of the rest portion 3 and the selected value of load.

Ideally the vertical components of the upward and downward forces should be equal and opposite throughout the height adjustment and for each selected load. In practice, some tolerance must be accommodated so that the iterative process of optimizing the geometry involves varying each of the parameters in order to observe its effect on the goodness of fit between the force curves.

These calculations can be performed manually or preferably can be computed using a personal computer using a "spread sheet" visual display in which the force curves and values of parameters can be displayed on the computer screen.

In an alternative arrangement the weight of the load may be automatically sensed by a suitable transducer and the spring force exerted by the gas spring 45 or 50 of FIGS. 3, 4 and 5 may be automatically adjusted by means of a control circuit to control an electromechanical actuator driving the control rod 36 in response to signals from the transducer.

In a further alternative arrangement the adjustable gas spring 45 or 50 of FIGS. 3, 4 and 5 may be supplemented by a non-adjustable spring such as a conventional gas spring. This further gas spring may be arranged to partially counterbalance the weight of the rest portion 3.

In the above described preferred embodiment the spring force is applied between the base and the linkage so as to be indirectly applied to the rest portion. Alternative arrangements are possible in which the spring force acts between the rest portion and the linkage or alternatively may directly act between the rest portion and the base.

The gas spring 45 or 50 of FIG. 3, 4 and 5 may be adjusted by alternative adjustment means comprising a lever mechanism, hydraulic jack or equivalent mechanical arrangement suitable for advancing and retracting the control rod 36 and may for example comprise an electromechanical system in which a motor is used to drive the control rod under either manual or automatic control.

Alternative arrangements are also envisaged in which a spring means other than a gas spring is utilized. A coil spring for example may be used provided that a suitable adjustment means is provided to adjust spring force. Such adjustment means could comprise a mechanical arrangement influencing the force exerted by the spring or alternatively a mechanism arrangement varying the mechanical advantage by which the spring acts to produce the required force.

The valve action provided by the check valves 86 and 89 referred to above with reference to FIG. 6 may alternatively be provided by any suitable valve means such as flow control valves of a type which present a resistance to flow which varies automatically in response to variation in flow rate. Such valve means may alternatively be provided by a single flow control valve in the position of valve 89 as shown in FIG. 6 and which is adapted to regulate flow in both directions.

Apparatus in accordance with the present invention may if desirable include alternative types of linkage and in particular may include a vertically extending telescopic linkage extending between the base and the rest portion. In such an arrangement, the spring means could conveniently utilize a linear actuator extending between the base and an upper portion of the telescopic linkage, the actuator being arranged to extend obliquely relative to the vertical direction. The actuator may be any of the gas spring arrangements disclosed above and may for example be of the type disclosed with reference to FIGS. 6 to 11.

A gas spring in accordance with the present invention may be used in a lifting hoist in which a load is supported beneath a lifting arm of the hoist, the arm being raised and lowered in use to effect height adjustment of the load. The gas spring may then be connected between the arm and a base to which the arm is pivotally connected and arranged to extend obliquely relative to the vertical direction. A geometry of the type disclosed above with reference to FIG. 14 may be utilized in which the link 11 may be regarded as a pivotal arm of a hoist and a load suspended from point 91 in place of support leg 10 shown in the Figure. The second link 12 would also be omitted from such an arrangement.

We claim:

1. Apparatus for use in supporting a load at an adjustable height comprising a rest portion for supporting a load in use, a base connected to the rest portion by a linkage facilitating adjustment of the height of the rest portion relative to the base and locking means selectively operable in a locking state to lock the position of the rest portion relative to the base and in an unlocked state to facilitate height adjustment, wherein the apparatus further comprises a gas spring operable at least when the locking means is in an unlocked state to apply a spring force directly or indirectly between the base and the rest portion and adjustment means operable independently of height adjustment to adjust the spring force such that an upward component of the spring force acting on the rest portion has a value which is thereby adjustable to exceed the weight of the rest portion by an amount substantially corresponding to the weight of the load and which remains substantially constant throughout the available height adjustment of the rest portion, the gas spring comprising a cylinder defining a chamber receiving a quantity of gas and a first piston movable within the cylinder in response to pressure of gas, the adjusting means comprising a second piston mounted in the cylinder to be movable independently of the first piston such that the volume of gas occupies a first portion of the chamber bounded by the first and second pistons, and wherein the adjusting means further comprises pump means operable to pressurize a volume of hydraulic fluid and communicating with a volume of hydraulic fluid filling a second portion of the chamber of the gas spring chamber bounded by the second piston whereby the pumping means is actuable to deliver fluid into the second portion of the chamber so as to move the second piston in a direction in which the gas volume is decreased.

2. Apparatus as claimed in claim 1 comprising a first pressure relief valve operable to relieve fluid pressure developed by the pump means above a maximum limit.

3. Apparatus as claimed in claim 1 further comprising a release valve communicating with the second portion of the chamber of the gas spring and selectively operable to allow hydraulic fluid to leave the second portion of the chamber to thereby effect adjustment of the second piston in a direction in which the gas volume is increased.

4. Apparatus as claimed in claim 3 wherein the locking means comprises a control valve selectively operable in the locking state to isolate the hydraulic ram from fluid communication with the third portion of the chamber of the gas spring.

5. Apparatus as claimed in claim 4 comprising pressure sensing means for sensing the pressures of hydraulic fluid on each side of the control valve.

6. Apparatus as claimed in claim 4 comprising a valve means connected between the hydraulic ram and the third portion of the chamber of the gas spring and operable to limit the rate of flow of hydraulic fluid to be less than a maximum limit.

7. Apparatus as claimed in claim 1 comprising a hydraulic ram operable to apply the spring force to the rest portion and comprising a hydraulic cylinder communicating with a volume of hydraulic fluid filling a third portion of the chamber of the gas spring bounded by the first piston.

8. Apparatus as claimed in claim 7 comprising a second pressure relief valve connected in parallel with the control valve and operable to communicate between the hydraulic ram and the third portion of the chamber of the gas spring in the event of the pressure across the control valve exceeding a maximum limit.

9. Apparatus as claimed in claim 7 wherein a linear actuator constituted by the hydraulic ram is connected between the base and the linkage such that pivotal movement of the linkage associated with raising and lowering of the rest portion is accompanied by extension and contraction respectively of the actuator during height adjustment.

10. Apparatus as claimed in claim 1 wherein the gas spring is operable to apply the spring force in a direction which is inclined relative to the vertical direction by an angle which is variable with pivotal movement of the linkage.

11. Apparatus as claimed in claim 10 wherein the linkage comprises a link member having first and second pivotal connections to the rest portion and the base respectively and wherein the gas spring acts on the link member at a location which is intermediate the first and second pivotal connections and which offset by a finite displacement from a locus of linear alignment with the pivotal axis of the pivotal connections when viewed in axial projection.

12. Apparatus as claimed in claim 11 wherein the gas spring acts on the base at a location which is intermediate the pivotal axes when viewed in vertical projection and which is below the level of the first pivotal connection between the base and the link member.

13. An adjustable chair-bed for use in supporting a patient during medical treatment comprising apparatus as claimed in claim 1.

14. A method of operating an apparatus for supporting a load at an adjustable height, the apparatus having a rest portion connected to a base by a linkage facilitating adjustment of the height of the rest portion relative to the base, a gas spring comprising a cylinder defining a chamber, first and second pistons movable within the cylinder, a volume of gas received in a first portion of the chamber bounded by the first and second pistons, the first piston being movable in response to pressure of the gas and a volume of hydraulic fluid filling a second portion of the chamber bounded by the second piston; the method comprising the steps of placing a load so as to be supported by the rest portion, applying a spring force by operation of a biasing means directly or indirectly between the base and the rest portion and actuating a pump means to deliver hydraulic fluid into the second portion of the chamber of the gas spring so as to move the second piston in a direction in which the gas volume is decreased, thereby adjusting the spring force such that an upward component of the spring force acting on the rest portion has a value exceeding the weight of the rest portion by an amount which is substantially constant throughout the range of height adjustment, adjusting the height of the load by raising and lowering the rest portion until a desired height is obtained and locking the rest portion relative to the base by operation of a locking means.

15. A method as claimed in claim 14 including the step of operating the adjusting means such that the variable amount is greater than or less than the weight of the load by an increment sufficient to effect raising or lowering of the load respectively during height adjustment.

16. A method as claimed in claim 15 including the step of applying an external force to the rest portion to control motion of the rest portion during height adjustment.

17. A method as claimed in claim 14 including the step of operating the adjusting means such that the variable amount is substantially equal to the weight of the load whereby the rest portion and the load are substantially held in equilibrium and applying an external force to provide motion of the rest portion during height adjustment.

18. A method as claimed in claim 17 including the step of locking the rest portion at a fixed height by operation of the locking means, sensing the weight of the load, sensing the available upward component of spring force and adjusting spring force to achieve equilibrium before releasing the locking means.

19. A gas spring comprising a gas spring cylinder defining a chamber; first and second pistons movable in the gas spring cylinder to define a first portion of the chamber receiving a quantity of gas and bounded by the first and second pistons, a second portion filled with hydraulic fluid and bounded by the second piston and a third portion filled with hydraulic fluid and bounded by the first piston; a hydraulic ram comprising a linear actuator operatively engaged with a hydraulic ram operating cylinder, the hydraulic ram operating cylinder being connected in fluid communication with the third portion whereby extension and contraction of the actuator is accompanied by displacement of the first piston to vary the volume of the gas within the first portion; and adjusting means operable to adjust the position of the second piston thereby adjusting the volume of the gas independently of the position of the first piston and of the actuator, wherein the adjusting means is operable to inject or withdraw hydraulic fluid to or from the second portion, and wherein the adjusting means comprises a pump means operable to pressurize a volume of hydraulic fluid and communicating with the second portion whereby actuation of the pumping means delivers fluid into the second portion so as to move the second piston in a direction in which the gas volume in the first portion is decreased.

20. A gas spring as claimed in claim 19 wherein the adjusting means comprises a release valve communicating with the second portion and selectively operable to allow hydraulic fluid to leave the second portion to thereby effect movement of the second piston in a direction in which the gas volume within the first portion is increased.

21. A gas spring as claimed in claim 19 comprising a first pressure relief valve operable to relieve fluid pressure developed in the second portion above a maximum limit.

22. A gas spring as claimed in claim 19 comprising a control valve selectively operable to isolate the hydraulic ram from fluid communication with the third portion, the control valve thereby constituting locking means operable to lock the actuator in a fixed position.

23. A gas spring as claimed in claim 22 comprising a second pressure relief valve connected in parallel with the control valve and operable to communicate between the hydraulic ram and the third portion in the event of the pressure across the control valve exceeding a maximum limit.

24. A gas spring as claimed in claim 19 comprising a valve means in line between the hydraulic ram and the third portion and operable to limit the rate of flow of hydraulic fluid to be less than a maximum limit.

25. A gas spring as claimed in claim 19 wherein the pump means and the operating cylinder of the hydraulic ram are mounted integrally in a common housing.

26. A gas spring as claimed in claims 19 wherein the adjusting means comprises a control rod connected to the second piston and extending into the second portion to a variable extent.

27. A gas spring cylinder assembly for use in a gas spring as claimed in claim 19 and comprising a cylinder defining a chamber, first and second pistons movable in the cylinder to define a first portion of the chamber receiving a quantity of pressurized gas bounded by the first and second pistons, and first and second hydraulic fluid couplings communicating with the second and third portions respectively for connection in use to a pumping means and to a hydraulic ram respectively.

28. A gas spring as claimed in claim 19, wherein:
the gas spring cylinder and the hydraulic ram operating cylinder are connected by a communication means for communicating fluid wherein a position of said hydraulic ram operating cylinder is independent from a position of the gas spring cylinder.

29. A gas spring as claimed in claim 28, further comprising:
control means for controlling fluid communication from the third portion and the hydraulic ram operating cylinder, the control means provided in the communication means.

* * * * *